Figure 1:
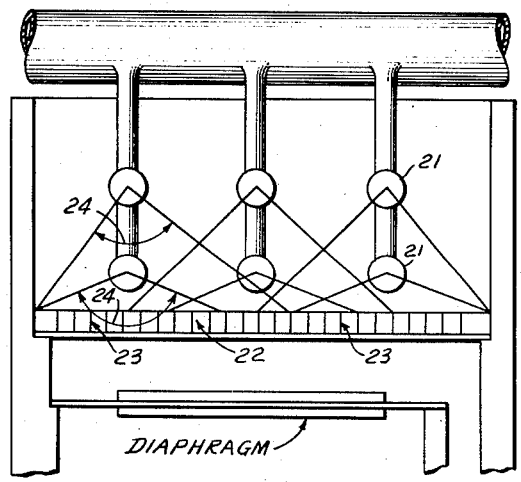

Sept. 2, 1952  J. McCRYSTLE  2,608,910
SCREENING OF FIBROUS MATERIAL
Filed April 26, 1946

Inventor
JOHN McCRYSTLE
By Watson, Bristol, Johnson & Leavenworth
Attorneys

Patented Sept. 2, 1952

2,608,910

UNITED STATES PATENT OFFICE 2,608,910

SCREENING OF FIBROUS MATERIAL

John McCrystle, New Brunswick, N. J.

Application April 26, 1946, Serial No. 665,314

5 Claims. (Cl. 92—20)

The invention relates to a method for separating acceptable fibrous material from undesirable material. More particularly, it pertains to a procedure for screening fibrous materials, and includes correlated improvements and discoveries which lead to a markedly improved operation.

The screening of fibrous materials, especially in the pulp and paper industry, has generally been effected by means of the flat screen. This screen separates material by segregation, selection as to fiber size, and relative specific gravity. Further, it operates on a percentage basis so that the smaller the quantity of undesirable material per unit of weight, the smaller will be the quantity of such matter passing the screen. However, the undesirable matter will not be prevented from passing through the screen if carried by a considerable quantity of water which permits it to remain for some time above the openings or slots so that it has an opportunity to pass therethrough. Moreover, a flat screen operates under a slightly unbalanced hydraulic head with the level of the screen suspension in the discharge flow box at, or slightly below, the level of the top of the screen plates. The fibrous material is usually carried in an aqueous suspension at a depth from one to eight inches which occasions a flow through the plates and into the discharge box. The fibrous suspension ordinarily is introduced onto the first screen of a line or series in such high dilution that the suspension is drawn through the openings or slots in the plates with sufficient water remaining to maintain the flow and to hold the fibers in suspension.

A difficulty usually encountered is that the fibers separate and form a film on the face of the plates thereby partially or wholly preventing flow therethrough, and in order to obviate this condition a very dilute suspension is maintained. As a consequence only a gentle flow of the suspension through the plates takes place, and if an attempt is made to increase the rate by creating a greater differential head by lowering the level of the discharged stock, then the underplate space will discharge faster than the suspension can flow through the plate with the result that a film of fibers forms on the plate and slows or wholly stops the screen action. When such occurs the level in the discharge flow box must be raised above the plates thus flooding them and allowing the upstroke of the diaphragm to remove the film. Interruptions of this kind cause loss of production and permit undesirable matter as dirt to pass through the screen.

Furthermore, showers of water are frequently used and these are applied as the suspension flows along the screen in order to replace the water removed and to cause forward movement of the unscreened material. It is a generally accepted principle that these showers must not be allowed to strike the plates directly but must flow into the suspension well above the plate level because if they were to strike the plate directly, there would be too great dilution and turbulence in the already dilute suspension which would result in undesirable matter being drawn through at the point at which they were to strike. Consequently, the showers are usually placed at the blank spaces between the screen frames rather than above the plates.

The operation of the screens consequently is attended by the following disadvantages: They cannot be used effectively with suspension above 0.5% stock consistency; they do not operate unless the space between the plates and the diaphragm is filled with liquid; they cannot operate with a large hydraulic head created by a low discharge level; and they operate under progressively worse conditions from the point of entrance of the suspension to the point of discharge.

It is an object of the invention to provide a method which obviates the disadvantages hereinabove mentioned.

Another object of the invention is to provide a method in accordance with which undesired matter as shives, dirt, scale, rust, and so forth accompanying a fibrous material may be removed with decreased loss of the desired fiber.

A further object of the invention is to provide a method whereby the rate of production of desired fiber is decidedly increased.

An additional object of the invention is the provision of a method wherein an aqueous suspension of fibers flowing over a screen is subjected to a positive jet action over the whole opening or slot area.

A more particular object of the invention is to provide a process in accordance with which fiber suspensions of high consistency may be readily and effectively screened with a decrease in the amount of desired fibers being rejected and a marked increase in the production rate of the screen.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the present invention fibrous materials, as wood pulp, hemp, flax, and the like, may be efficiently screened by preparing a suspension of the fibers which has a fiber concentration upwards from about 0.5%, desirably from about 0.5 to about 2.0%, and preferably about 1%. The suspension is then passed over a flat screen having suitable openings therein as slots. As the suspension is passing over the screen, streams or jets of water under pressure are introduced in such a manner that the opening areas of the screen are wholly swept thereby. The introduction of the water stream is desirably at an angle less than seventy-five degrees to the plane of the screen, and suitably is about thirty degrees. When operating in the foregoing manner, a suspension of fibrous material may be readily and effectively screened in a relatively short period of time, or by passing over a relatively smaller screening surface.

Further, the screening action may be facilitated by controlling the consistency of the material to be screened in addition to the positive water jet action over the whole slot area through a removal of water. This removal may be accomplished by a thickener which usually would be placed between the frames of a screening assembly. In this manner a maximum passage of acceptable fiber is maintained at all times which entails a maximum separation from undesirable matter.

When the suspension after having been subjected to the jet action has been thickened desirably to its initial consistency, it is then passed over another screen with introduction of water in accordance with the positive jet action. The jets are positioned above the screen plates and water passed therethrough under appreciable pressure is forced against the face of the plates at an accurately predetermined angle whereby a positive sweeping action over the entire slot area is obtained. The jets having been placed in operation, the fiber suspension is then introduced, and this suspension may contain from about 0.5 pound to about 2.0 pounds of fiber to 100 pounds of suspension, or expressed somewhat differently a suspension containing from about 0.5 to about 2.0% of fibers. The level of the screened stock in the discharge flow box is then lowered which occasions a pressure differential between the suspension on the plate and that in the discharge box which results in a suspension being drawn through the plates which is substantially that initially present. Inasmuch as the entire slot area is subjected to the action of the jets, there is a maximum volume of suspension passing through each slot or opening, and additionally the jets remove and dilute the fiber between the slots which then passes to the next succeeding series of slots. Hence, a thick suspension containing a considerable quantity of fiber per unit of volume is presented to the suction action of the diaphragm. Inasmuch as the maximum potential capacity of a screen is determined by the total area of the slots, the positive jet action over tthe whole area occasions the passage through the slots of a markedly increased amount of fiber inasmuch as the suspension is of a higher consistency, that is more concentrated, and because the slots are maintained in an open full capacity condition.

The introduction of the jets of water although giving a minimum of dilution, however, does reduce the concentration as the suspension travels along the screen, and for the purpose of maintaining a high operative capacity per screen unit and a decided selective action throughout, a thickener is placed in the screen assembly at that point at which the suspension has become diluted below the desired level. This will depend upon the consistency of the incoming suspension and it is preferred to maintain it above 50% of the initial consistency. Thus, if a suspension of 1% consistency is being introduced onto the first screen, the removal of water, that is the thickening, should be effected at a point where the dilution has lowered the consistency to 0.5%. The thickening or water removal suitably is carried to the extent at which substantially the initial consistency is restored whereupon the suspension is passed to another and succeeding screen.

The foregoing procedure brings about a decidedly improved separation of undesired matter from clean fiber because the jets of water sweeping the whole slot area carry away oversize fibrous matter, rust, scale, and the like, as soon as a slot fails to pass it, and the quantity of acceptable fiber passing through each plate is considerably greater due to the fact that the operation takes place more rapidly thus minimizing the number of times that the undesirable matter comes in contact with the slots. Additionally a much higher concentration of fiber in the suspension may be maintained above the plates which causes the larger particles of undesirable matter as shives and dirt to float in the stream of stock suspension at a higher level above the plates.

Furthermore, the method leads to a reduction in the number of screen frames due to the positive jet action over the whole slot area because each frame delivers a much greater quantity of acceptable fiber.

The screening of fiber for the manufacture of paper may be carried out with a desired production of about 30 to 60 tons per day, and this will require separation only of large particles of undesirable matter, such as lumps, scale and so forth, so that the plates may be provided with relatively large slots. The positive jet action is arranged at a predetermined angle over the whole slot area as above described, and the method may be carried through with only two screen frames in series with a thickener placed between them. The screens may be fed with a suspension containing from about 0.04 to 0.16 pound of fiber per gallon, and with a flow of about 750 gallons per minute. The preferred amount of fiber is about 0.1 pound per gallon, and the suspension flowing from the first screen frame passes to a thickener, which may be of the rotary filter type, which removes water in a quantity sufficient to restore the fiber concentration to about 0.5 pound per gallon whereupon the thickened suspension is then passed to the second screen or frame. The second screen is arranged in the same manner as the first with the positive jet action sweeping the whole slot area. As a result the rejected material passing from and over the second screen contains only a minimum of acceptable fiber.

The jets may be attached to a suitable header through which water is forced at a pressure from about 10 to about 70 pounds, preferably about 50 pounds, per square inch gauge. The jets are set at a distance from about one to eight inches above the plates, and are at an angle less than seventy-five degrees, preferably about thirty degrees, to the plane of the plates. Further, the jets are so placed that a fine stream of high pressure water strikes the slotted sections at an angle, and these fine streams of high pressure water sweep the whole slot area. The suspension of fibrous material containing not less than 0.5 pound and suitably not over 2 pounds of fiber per 100 pounds of mixture, preferably about 1 pound is introduced at a horizontal rate of flow which is about 150 feet per minute. When the flow from the jets has been adjusted so that the whole slot area is subjected to their action, and when the concentration of the feed has been adjusted, then the hydraulic head between the stock on the screen and the discharge flow box is increased with the result that the volume of flow through the slots is raised.

Moreover, the suspension introduced to the first screen as above indicated is carefully regulated as to volume as well as to consistency. More particularly, and for the screening of 100 tons of air-dried fiber per day, there may be arranged two parallel lines of from one to four screen frames per line, preferably two, with separate flow boxes. A fiber suspension is introduced upon the screen at a rate of about 1,000 gallons per minute with the suspension containing about 0.835 pound, that is about 1% of dry fiber, per gallon. The rejected stock flowing from the ends of the two lines is collected in a common flow box and conducted through a thickener, such as a rotary filter or cylinder or an inclined wire which may be of the Niagara type, wherein water is removed with an attending increase in consistency of the suspension, preferably to the initial consistency, that is about 1%. The thickened suspension is then fed to a single line of screens whereupon separation of the acceptable fiber from the undesired matter is effected under the same conditions, that is with positive jet action over the whole slot area. Thereby a marked increase in production of acceptable fiber is obtained, and the consistency of the suspension flowing from the thickener is carefully regulated so that a suspension of controlled concentration is delivered to the second or succeeding screening stage.

Figure 2:
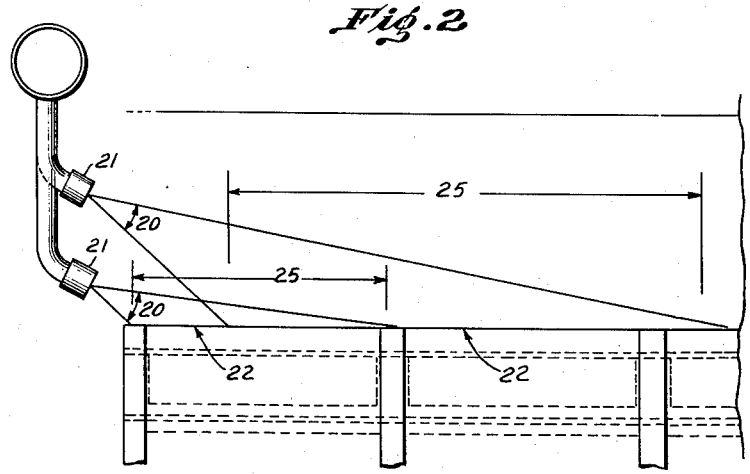

An apparatus suitable for carrying out the above described method is shown in the accompanying drawing in which Figure 1 illustrates a transverse arrangement of the apparatus and Fig. 2 depicts a side elevation thereof. The apparatus consists of the usual flat type of screen in connection with which there is provided a particular arrangement of jets whereby streams of water are introduced under pressure at an angle less than seventy-five degrees to the plane of the screen in such a manner that the entire opening areas of the screen are directly, wholly and simultaneously subjected to the action thereof. More particularly, the drawing shows the longitudinal angle of sweep 20 from the jets 21 to the input side of the screen plates 22 and the screen plate slots or opening areas 23. Further there is illustrated the transverse angle 24 and area of contact 25 of screen plate coverage by each of the jets 21. It will be realized that the number, size, the angle of contact which preferably is about thirty degrees and the performance characteristics of each jet sweeping the screen plates may be varied and that this will depend on the operating conditions. However, in every instance the entire slot area of the screen plates is directly, wholly and simultaneously subjected to the action of one or more of the jets.

The procedure hereinabove described leads to certain advantageous results among which the following may more particulary be mentioned: A greater quantity of fiber may be screened per unit with a reduction in the number of plates required and an accompanying saving in installation, maintenance and operating costs; the screening may be conducted at markedly higher concentrations of fiber than usual whereby a reduction in the volume of water is effected with economies in installation, power, maintenance, and size of thickener; a much cleaner stock is produced which leads to an improved quality of the product for which the fiber is employed; the quantity of acceptable fibrous material rejected is materially decreased; shutdowns due to plugging of screens, priming the screens, hosing the plates, and so forth which are frequent in prior screening operations are eliminated; and the screening of "free" fibrous materials, that is those which separate easily from water such as high alpha wood pulps, hemp, flax, and so forth, may be accomplished without difficulty due to the positive jet action over the whole slot area whereas in prior procedures the screening of such materials was attended with much difficulty owing to the tendency of these fibers to separate from the suspension and form a mat on the plates.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent is:

1. A method for operating a flat screen for screening fibrous materials which consists essentially of the following steps preparing a suspension of fibers, flowing said suspension over the screen, introducing positive jet streams of water under pressure at an angle less than seventy-five degrees to the plane of the screen onto the input side of said screen, and the said streams being introduced so that the entire opening areas of the screen are directly, wholly and simultaneously subjected to the action thereof.

2. A method for operating a flat screen for screening fibrous materials which consists essentially of the following steps preparing a suspension of fibers having a fiber concentration from about 0.5% to about 2.0%, flowing said suspension over the screen, introducing positive jet streams of water under pressure at an angle less than seventy-five degrees to the plane of the screen onto the input side of said screen, and the said streams being introduced so that the entire opening areas of the screen are directly, wholly and simultaneously subjected to the action thereof.

3. A method for operating a flat screen for screening fibrous materials which consists essentially of the following steps preparing a suspension of fibers having a fiber concentration from about 0.5% to about 2.0%, flowing said suspension over the screen, introducing positive jet streams of water under pressure at an angle of about thirty degrees to the plane of the screen onto the input side of said screen, and the said streams being introduced so that the entire opening areas of the screen are directly, wholly and simultaneously subjected to the action thereof.

4. A method for operating a flat screen for screening fibrous materials which consists essentially of the following steps preparing a suspension of wood fibers having a fiber concentration from about 0.5% to about 2.0%, flowing said suspension over the screen, introducing positive jet streams of water under pressure at an angle less than seventy-five degrees to the plane of the screen onto the input side of said screen, and the said streams being introduced so that the entire opening areas of the screen are directly, wholly and simultaneously subjected to the action thereof.

5. A method for operating a flat screen for screening fibrous materials which consists essentially of the following steps preparing a suspension of wood fibers having a fiber concentration from about 0.5% to about 2.0%, flowing said suspension over the screen, introducing positive jet streams of water under pressure at an angle of about thirty degrees to the plane of the screen onto the input side of said screen, and the said streams being introduced so that the entire opening areas of the screen are directly, wholly and simultaneouly subjected to the action thereof, then increasing the consistency of the suspension substantially to the initial consistency and flowing it over another screen with introduction of water in the foregoing manner.

JOHN McCRYSTLE.

REFERENCES CITED

The following references are of record in the file of this patent:

UNITED STATES PATENTS

| Number | Name | Date |
|---|---|---|
| 795,883 | Babbitt et al. | Aug. 1, 1905 |
| 834,596 | Walters | Oct. 30, 1906 |
| 927,885 | Sherwood | July 13, 1909 |
| 955,898 | Petsche | Aug. 8, 1916 |
| 1,313,145 | Westad et al. | Aug. 12, 1919 |
| 1,919,201 | Clements et al. | July 25, 1933 |
| 2,409,524 | Ahlfors | Oct. 15, 1946 |

FOREIGN PATENTS

| Number | Country | Date |
|---|---|---|
| 26,296 | Great Britain | of 1907 |

OTHER REFERENCES

Modern Pulp and Paper Making, 2nd ed. (1942), by Witham, published by Reinhold Pub. Corp., New York, pp. 251, 252, 255, 256, 379 and 380.

Manufacture of Pulp and Paper, 3rd ed. (1939), published by McGraw-Hill Book Co., New York, vol. III, section 6, pp. 42 to 45.